United States Patent [19]
Krafzig et al.

[11] 4,096,928
[45] Jun. 27, 1978

[54] VALVE ASSEMBLY FOR A SHOCK ABSORBER

[75] Inventors: Rolf Krafzig; Paul Langer; Erhard Leppich, all of Wolfsburg, Germany

[73] Assignee: Volkswagenwerk Aktiengesellschaft, Wolfsburg, Germany

[21] Appl. No.: 806,496

[22] Filed: Jun. 14, 1977

[30] Foreign Application Priority Data

Jun. 26, 1976 Germany .............................. 2628893

[51] Int. Cl.² ............................................. F16F 9/348
[52] U.S. Cl. .................................. 188/282; 137/493.8; 137/512.5
[58] Field of Search ............... 188/322, 317, 282, 320; 137/493, 493.8, 493.9, 512.5, 516.23, 529, 543.19

[56] References Cited

U.S. PATENT DOCUMENTS

| | | | |
|---|---|---|---|
| 3,199,638 | 8/1965 | Otomo | 188/322 X |
| 3,874,487 | 4/1975 | Keijzer | 137/493.9 X |
| 4,034,860 | 7/1977 | Leppich | 188/322 |

FOREIGN PATENT DOCUMENTS

| | | | |
|---|---|---|---|
| 7,782 | 12/1969 | Japan | 188/282 |

*Primary Examiner*—George E. A. Halvosa
*Attorney, Agent, or Firm*—Spencer & Kaye

[57] ABSTRACT

A valve assembly for a shock absorber which has separate first and second channels for the opposite flow directions of the damping medium contained in the shock absorber includes at least one first valve and one second valve having a common shaft and arranged to control the first channel and the second channel, respectively. The first valve includes at least one resilient valve disc and a first spring biasing the resilient valve disc with the interposition of a valve body. The second valve includes a closing disc and a second spring urging the closing disc into a closed position. The resilient disc and the closing disc surround the common shaft. The valve assembly further has an axially displaceable valve cage being common to the first and second valves. The valve cage has a cylindrical portion surrounding the resilient valve disc for a centered guiding thereof. The cylindrical portion has an edge face which serves as an abutment for cooperating with the closing disc. The valve cage further has a disc-like portion including spring support faces for engaging the first and second springs.

6 Claims, 2 Drawing Figures

VALVE ASSEMBLY FOR A SHOCK ABSORBER

BACKGROUND OF THE INVENTION

This invention relates to a valve assembly for a shock absorber which contains a damping medium and a piston which, dependent upon the sense of external forces applied thereto, seeks to displace the medium in the one or the other direction. For the two flow directions of the damping medium there are provided, in the shock absorber, separate flow channels, each provided with at least one valve. The valve of the flow channels for the one flow direction has at least one resilient disc spring-biased by a valve body and the valve of the flow channels for the other flow direction comprises a spring-biased closing disc. The two valves have a common shaft which is surrounded by the resilient disc and the closing disc. A valve assembly of this type is disclosed in U.S. Pat. Application Ser. No. 560,081, filed Mar. 19th, 1975, now Pat. No. 4,034,860, (a valve assembly incorporated in the shock absorber piston is shown in FIG. 2, while a valve assembly designed as a foot valve at the bottom of the shock absorber is illustrated in FIG. 5).

SUMMARY OF THE INVENTION

It is an object of the invention to provide an improved valve assembly of the above-outlined type in which, by means of simple and inexpensive individual components, support faces for the valve disc springs and a centered guidance for the resilient valve discs are provided. The latter is to be ensured even if the resilient valve discs are clamped in the zone of their outer periphery and surround a zone of reduced diameter about the axis. Such an arrangement permits the use of spring discs having relatively large radial dimensions and thus soft spring characteristics.

These objects and others to become apparent as the specification, progresses, are accomplished by the invention, according to which, briefly stated, the valve assembly for a shock absorber which has separate first and second channels for the opposite flow directions of the damping medium contained in the shock absorber includes at least one first valve and one second valve having a common shaft and arranged to control the first channel and the second channel, respectively. The first valve includes at least one resilient valve disc and a first spring biasing the resilient valve disc with the interposition of a valve body. The second valve includes a closing disc and a second spring urging the closing disc into a closed position. The resilient disc and the closing disc surround the common shaft. The valve assembly further has an axially displaceable valve cage being common to the first and second valves. The valve cage has a cylindrical portion surrounding the resilient valve disc for a centered guiding thereof. The cylindrical portion has an edge face which serves as an abutment for cooperating with the closing disc. The valve cage further has a disc-like portion including spring support faces for engaging the first and second springs.

In accordance with one embodiment of the invention, the valve cage is constituted by the valve body which is present in any event and which has a cylindrical portion surrounding the resilient disc and a collar-like part projecting beyond the cylindrical portion to serve as a support for the spring associated with the closing disc.

In accordance with another embodiment of the invention, the valve cage is constituted by a separate component which further has an annular portion to be supported by a radially extending shoulder of the shaft. It is in particular this embodiment of the invention which permits the valve cage to be made of sheet metal, comprising leg-like parts which are bent to extend axially to form the cylindrical and annular portions. Further legs which extend at least approximately as a continuation of the disc-like portion form the collar-like part.

DESCRIPTION OF THE PREFERRED EMBODIMENTS

Figure 1:
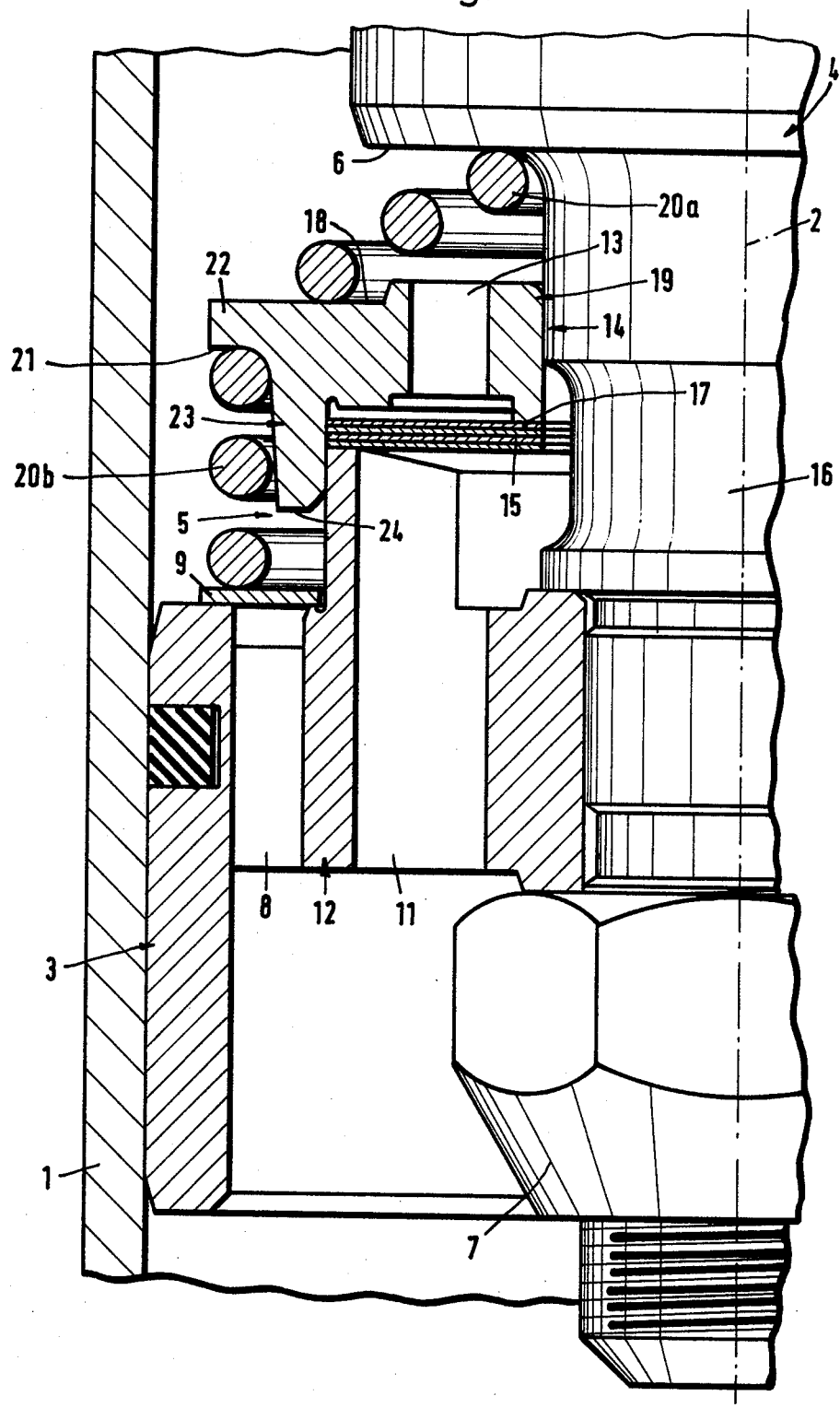
FIGS. 1 and 2 are axial sectional views of two preferred embodiments of the invention, incorporated in the piston of the telescopic shock absorber.

Turning first to the embodiment illustrated in FIG. 1, in a shock absorber cylinder 1 which contains a liquid damping medium, there is arranged, in a conventional manner, a piston assembly 3 displaceable parallel to the shock absorber axis 2. The piston assembly 3 is secured to a lower, several times stepped terminal portion of a piston rod 4. This terminal portion also serves as the mounting shaft for a valve assembly generally indicated at 5. The individual components of the valve assembly 5 are securely held between a radially extending shoulder 6 of the piston rod 4 on the one side and a nut 7 threadedly mounted on the piston rod terminus, on the other side.

Upon displacements of the piston 3 in the downward direction, as viewed in FIG. 1, channels 8 (of which only one is visible) distributed in a rotationally symmetrical manner about the axis 2 become operational, because the closing disc 9, associated with the channels 8, may lift in response to the upwardly directed liquid pressure, overcoming the force of the spring 20 which urges the disc 9 into its closed position. In case of displacements of the piston 3 in the opposite (upward) direction, a plurality of channels (only one shown), each formed of a channel portion 11 and a channel portion 13 become operative. Each channel portion 11 is provided in a main part 12 and each channel portion 13 is provided in a valve body 14. The channel portions 11 and 13 are associated with a valve stack formed of resilient discs 15 supported at their outer periphery. The portion 16 of the piston rod 4 situated in the zone of the resilient discs 15 has a diameter which is smaller than that of the axially adjacent piston rod portions, so that the resilient discs 15, despite a small spatial requirement in the radial direction, nevertheless have a relatively large inwardly oriented radial dimension and thus may have a soft spring characteristic. Consequently, immediately after lifting of the inner circumferential zones of the resilient discs from their valve seat 17, a relatively large open cross section is made available for the passage of the damping liquid.

The valve body 14 is so structured that it also constitutes a valve cage. The upper, radially extending annular face 18 of the approximately ring-shaped or disc-shaped zone 19 of the valve body 14 which extends transversely to the axis 2, serves as the support face for a coil spring 20a which is associated with the resilient discs 15. The valve body 14 further has a radially extending face 21 formed as the underside of a collar-like portion 22 of the valve body 14. The face 21 serves as a support for a coil spring 20b engaging, at its other end, the closing disc 9. The valve body 14 also has a cylindrical zone 23 which forms a centering guide for the resilient discs 15. The radially extending terminal edge 24 constitutes an abutment for the closing disc 9.

Figure 2:
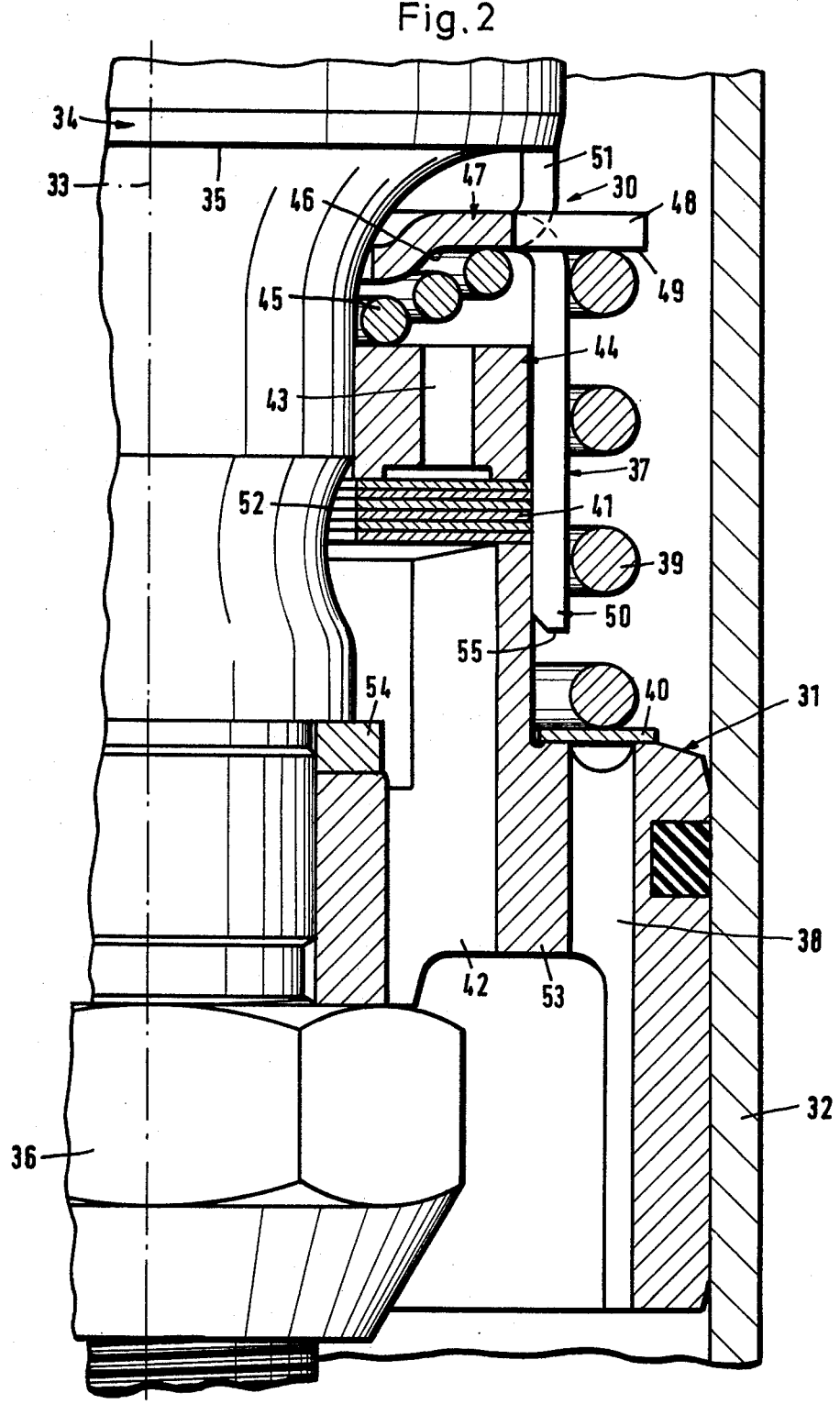

Turning now to the second embodiment shown in FIG. 2, the valve cage 30 is constituted by a separate, independent component. This embodiment too, is incorporated in the piston assembly 31 of a telescopic shock absorber. The piston assembly 31, similarly to the piston assembly 3 in the first embodiment, is received in a cylinder 32 for reciprocation in either direction parallel to the shock absorber axis 33. The valve assembly generally indicated at 37 is, as in the first embodiment, held together by the lower terminal portion of the piston rod 34 and is thus clamped between a shoulder face 35 of the piston rod and a nut 36 threaded to the piston rod terminus.

Upon downward motion of the pistion, as viewed in FIG. 2, the liquid damping medium is displaced upwardly through the flow channel 38 as the force of the coil spring 39 urging the disc 40 into a closed position to obturate channel 38 is overcome by the pressure of the liquid medium. In the flow channel formed of flow channel portions 42 and 43, provided in a main body 53 and in a valve body 44, respectively, there are provided resilient discs 41 forming a stack which, when the piston moves upwardly, open in a downward direction in response to downwardly oriented liquid pressure. As in the first-described embodiment, there may be provided a plurality of channels 38 and 42, 43, hidden from view. Again, the spring discs 41 are clamped at their outer periphery; this clamping is effected by the valve body 44 urged against the spring disc stack by a coil spring 45. The valve body 53 is clamped to a radially extending shoulder of the piston rod 34 by the nut 36 with the intermediary of a washer 54.

The valve cage 30 has four different zones or portions for performing different functions: first, a circular base 47 surrounding, with a clearance, a stepped part of the piston rod, provides a support face (spring seat) 46 for the spring 45. Second, in the plane of the circular base 47 there extend radially outwardly oriented legs 48 (only one is visible) which constitute a collar-like portion for providing a support face (spring seat) 49 for the spring 39. Third, from the circular base 47, leg-like projections 50 (only one is visible) are bent to extend downwardly in an axially parallel relationship for forming a cylindrical portion which serves as a centering guide for the resilient discs 41 and, with a radially extending free face 55, as an abutment for the closing disc 40. Fourth, from the circular base 47, leg-like projections 51 (only one is visible) are bent to extend upwardly in an axially parallel relationship for forming an axially oriented annular portion which serves to support the valve cage 30 on the radially extending shoulder face 35 of the piston rod. As viewed in the circumferential direction, legs 48, 51 and 50 periodically succeed one another. In this embodiment too, by virtue of the centering function of the valve cage 30 with regard to the movements of the resilient discs 41, it is feasible to provide a recessed piston rod portion 52 which has a reduced diameter.

The particular advantage of the construction of the valve body resides in its simple manufacture which need to consist only of cutting (stamping) and bending steps performed on a sheet material.

It is to be understood that the piston rod portions 16 (FIG. 1) and 52 (FIG. 2) may have flow passages constituted by axially extending, parallel-spaced grooves alternating with axially extending web-like portions, rather than by the circumferential, groove-like depressions illustrated in FIGS. 1 and 2.

While the valve assemblies of both embodiments are described as being incorporated in the piston of the shock absorber, it is to be understood that these examples are not meant to so limit the invention; it is feasible to use the same, for example, as the stationarily supported bottom valves (foot valves) in a base portion of the shock absorber cylinder.

It will be understood that the above description of the present invention is susceptible to various modifications, changes and adaptations, and the same are intended to be comprehended within the meaning and range of equivalents of the appended claims.

What is claimed is:

1. In a valve assembly for a shock absorber containing a damping medium and including means defining separate first and second channels for the opposite flow directions of the damping medium; the valve assembly having an axially displaceable valve body; at least one first valve and one second valve arranged to control the first channel and the second channel, respectively; the first valve including at least one resilient valve disc, and a first spring urging the valve body against the resilient valve disc for spring-biasing the resilient valve disc; the second valve including a closing disc and a second spring urging the closing disc into a closed position; and a shaft common to said first and second valves and being surrounded by the resilient valve disc and the closing disc; the improvement comprising an axially displaceable valve cage being common to said first and second valves, said valve cage having a cylindrical portion surrounding said resilient valve disc for a centered guiding thereof, said cylindrical portion having, at an edge face, an abutment for cooperating with said closing disc; said valve cage further having a disc-like portion including first and second spring support faces for engagement with said first and second springs.

2. A valve assembly as defined in claim 1, wherein said valve cage is constituted by said valve body; said valve body having a radially extending face oriented away from said resilient valve disc and constituting said first spring support face, and a circumferentially extending collar-like portion arranged axially adjacent the cylindrical portion; said collar-like portion having a radially extending underside oriented towards said closing disc and constituting said second spring support face; said collar-like portion and said radially extending face forming part of said disc-like portion of said valve cage.

3. A valve assembly as defined in claim 1, wherein said valve cage is arranged on said valve body at a radially extending side thereof which is oriented away from said resilient valve disc; said cylindrical portion of said valve cage surrounding said valve body and extending axially therebeyond; said disc-like portion of said valve cage including a first radially extending face constituting said first spring support face oriented towards said valve body and arranged radially inwardly of said cylindrical portion at an end thereof; said disc-like portion further including a collar-like part extending radially beyond said cylindrical portion and having a second radially extending face constituting said second spring support face; said valve cage further including an annular portion arranged at a radial face of said disc-like portion oriented away from said cylindrical portion; said annular portion of said valve cage being pressed against a shoulder of said shaft member by said first and second springs.

4. A valve assembly as defined in claim 3, wherein said valve cage has
   (a) a circular base;
   (b) a plurality of first spaced legs attached to the circumference of said circular base and extending radially outwardly therefrom; said first spaced legs together constituting said collar-like part; said circular base and said first spaced legs together constituting said disc-like portion;
   (c) a plurality of second spaced legs attached to the circumference of said circular base and extending axially parallel in the direction of said valve body and substantially perpendicularly to said circular base; said second spaced legs together constituting said cylindrical portion of said valve cage; and
   (d) a plurality of third spaced legs attached to the circumference of said circular base and extending axially parallel in a direction oriented away from said valve body and substantially perpendicularly to said circular base; said third spaced legs together constituting said annular portion of said valve cage; said first, second and third spaced legs being arranged along the circumference of the base in a periodic sequence.

5. A valve assembly as defined in claim 1, wherein said shock absorber includes a cylinder containing said damping medium; a piston slidably received in said cylinder and a piston rod carrying said piston; said valve assembly being mounted on said piston rod in the zone of said piston; said shaft constituting one part of said piston rod.

6. A valve assembly as defined in claim 1, further comprising means clamping said resilient valve disc along its outer periphery; said shaft having, in the zone of said resilient valve disc, a reduced diameter relative to the diameter of shaft portions adjacent said zone.

* * * * *